(12) United States Patent
Oh et al.

(10) Patent No.: US 7,378,805 B2
(45) Date of Patent: May 27, 2008

(54) SINGLE-STAGE DIGITAL POWER CONVERTER FOR DRIVING LEDS

(75) Inventors: In-Hwan Oh, Cupertino, CA (US); Madhu Rayabhari, Cupertino, CA (US)

(73) Assignee: Fairchild Semiconductor Corporation, South Portland, MA (US)

( * ) Notice: Subject to any disclaimer, the term of this patent is extended or adjusted under 35 U.S.C. 154(b) by 0 days.

(21) Appl. No.: 11/086,955

(22) Filed: Mar. 22, 2005

(65) Prior Publication Data

US 2006/0214603 A1 Sep. 28, 2006

(51) Int. Cl.
*H05B 37/02* (2006.01)
(52) U.S. Cl. .................. 315/291; 315/219; 315/307
(58) Field of Classification Search .......... 315/291, 315/219, 307
See application file for complete search history.

(56) References Cited

U.S. PATENT DOCUMENTS

| | | | |
|---|---|---|---|
| 5,377,092 A | * | 12/1994 | Rowand et al. ............ 363/41 |
| 5,661,645 A | | 8/1997 | Hochstein |
| 5,736,881 A | | 4/1998 | Ortiz |
| 6,057,651 A | | 5/2000 | Usami |
| 6,091,614 A | | 7/2000 | Malenfant |
| 6,400,101 B1 | | 6/2002 | Biebl et al. |
| 2002/0158590 A1 | | 10/2002 | Saito et al. |
| 2006/0113975 A1 | * | 6/2006 | Mednik et al. ............ 323/282 |

* cited by examiner

*Primary Examiner*—David H. Vu
(74) *Attorney, Agent, or Firm*—Sidley Austin LLP (57) ABSTRACT

This invention presents a single-stage power converter for driving many number of Light-Emitting-Diode (LED). The power converter converts an AC input voltage into DC current source and regulates the current flowing into the LED. In addition, the AC input current is controlled to have a sinusoidal waveform synchronized with the AC input voltage so that AC input Power Factor is corrected. Hence, both of Power Factor Correction (PFC) and LED current regulation are obtained simultaneously by using a single power conversion stage. So higher efficiency with low cost can be obtained.

16 Claims, 7 Drawing Sheets

SINGLE-STAGE DIGITAL POWER CONVERTER FOR DRIVING LEDS

TECHNICAL FIELD OF THE INVENTION

This invention relates to power conversion, and more particularly, a single-stage digital power converter for driving light-emitting diode (LEDs).

BACKGROUND

LEDs have become increasingly popular as a lighting choice and, for many applications, have begun to replace conventional lamps having filament. For example, LEDs are now widely used in traffic signal lights and for the back lighting of liquid crystal display (LCD) panels.

In many applications, it is it desirable to vary the lighting output (i.e., brightness) of an LED. Generally, it is difficult to use voltage control for controlling LED brightness. Instead, the brightness of an LED is proportional to its current. Therefore, LED current should be controlled to control LED brightness (e.g., for dimming an LED). With the increased popularity of LEDs in numerous applications which require varying degrees of brightness, there is an increasing need for a suitable power converter for controlling LED current.

In some applications, the power for driving LEDs is in the form of an alternating current (AC) input. In this case, the AC line current needs to be synchronized to the line voltage, thus minimizing line current distortion so that the transferred energy from the power source is maximized. If there is a phase delay between the incoming voltage and current, the transferred energy is circulated from source to load. This reduces the power transferred from the source to the load in relation to the cosine of its phase difference. If the voltage and line current are made to be in phase, the phase difference is zero and its cosine becomes unity. This technique is known as power factor correction (PFC). Sometimes, the line current may be distorted and harmonics are involved in the line current by power conversion processing.

According to some previous designs, power converters for LEDs require at least two power stages in order to provide both control of LED current as well as power factor correction (PFC). Each power stage performs some form of power conversion. Typically, the first stage is referred to as a pre-regulator and provides PFC control. The second stage is a DC-to-DC converter and provides LED current control. Because any given power stage is not 100% efficient, there is a loss of power across each stage for such power converters. This results in lower overall efficiency for the power converter. For example, assuming that the each of two power stages in a previous design power converter is 90% efficient, then the overall system efficiency will be 81% efficient (0.90×0.90=0.81).

SUMMARY

According to embodiments of the present invention, a power converter with a single power stage provides PFC control as well as LED current regulation. The power converter may have a hybrid control technique, which can use a digital control method for controlling LED current or an analog control method for highly dynamic, cycle-by-cycle current protection.

According to an embodiment of the present invention, a power converter is provided for driving at least one light-emitting diode (LED), the power converter comprises a single stage operable to provide both power factor correction (PFC) for input power and control of current delivered to the at least one LED.

According to another embodiment of the present invention, a power converter is provided for driving a plurality of groups of light-emitting diodes (LEDs) using an input power, wherein the diodes in each group are the same color. The converter comprises means for providing power factor correction (PFC) for the input power; and means for controlling current delivered to the at least one LED.

Important technical advantages of the present invention are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION

The embodiments of the present invention and their advantages are best understood by referring to FIGS. 1 through 9 of the drawings. Like numerals are used for like and corresponding parts of the various drawings.

Figure 1:
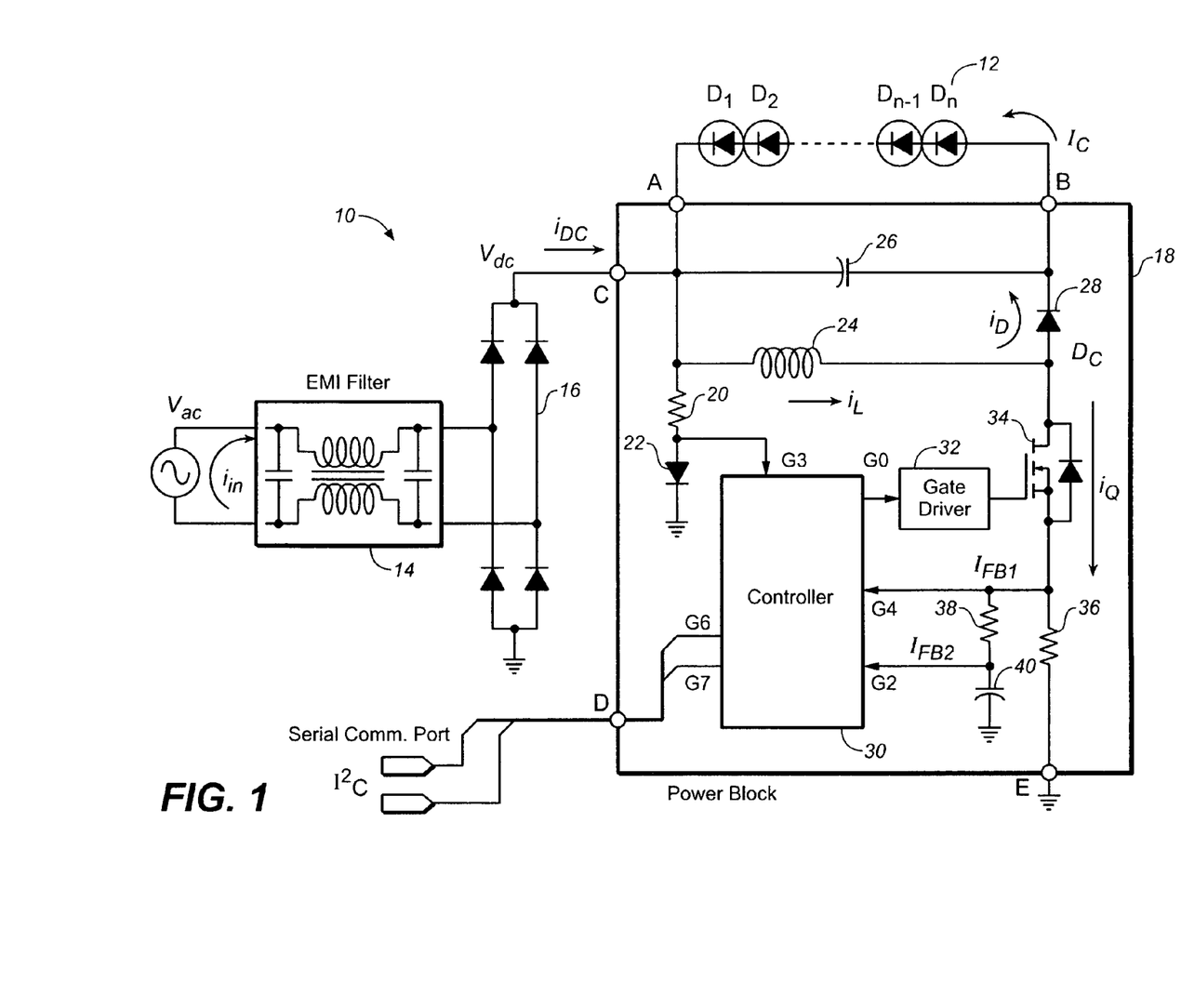
FIG. 1 is a schematic diagram in partial block form of an exemplary implementation for a digital single-stage power converter for driving LEDs, according to an embodiment of the present invention.

FIG. 1 is a schematic diagram in partial block form of an exemplary implementation for a digital single-stage power converter 10 for driving one or more light emitting diodes (LEDs) 12, according to an embodiment of the present invention. As depicted, power converter 10 includes an electromagnetic interference (EMI) filter 14, a rectifier 16, and a power block 18. Power converter 10 receives an alternating current (AC) voltage Vac at its input terminal, converts the AC voltage into a direct current (DC) voltage Vdc, and provides a current for driving the LEDs 12

(separately labeled D1, D2, ..., Dn-1, and Dn, and coupled as a load) at its output terminals A and B. Power converter 10 converts AC high input voltage into a desired voltage level, which can be higher or lower than the rectified AC input level. This allows the LED current to be properly controlled for a desired brightness level. In addition, the AC input current is well synchronized with the AC input voltage. If a constant frequency is used, third harmonic terms would be present in the line current. To address this, in one embodiment, the power converter 10 may use a modified duty control scheme (based on a sine table). The modified duty control scheme controls or modifies the duty cycle to reduce or eliminate the third harmonic in AC input current.

EMI filter 14 functions to filter higher harmonic terms which may be caused by a switching operation in power block 18 so that the AC input current can be a fundamental frequency (e.g., a 60/50 Hz) sinusoidal waveform. By using a modified digital pulse width modulation (PWM) method, low frequencies (specifically the third harmonic) can be inherently eliminated. The harmonic frequencies generated by the PWM method are relatively high terms. Thus, a low cut-off frequency filter can be utilized for EMI filter 14. Therefore, the EMI filter 14 can be relatively small and inexpensive. EMI filter 14 can be implemented using one or more capacitors, transformers, or inductors, as is understood to those of ordinary skill. Rectifier 16 functions to rectify the AC input voltage to produce the DC voltage Vdc. As shown, rectifier 16 can be implemented with a plurality of diodes arranged in a full-wave rectifier configuration.

Figure 9:
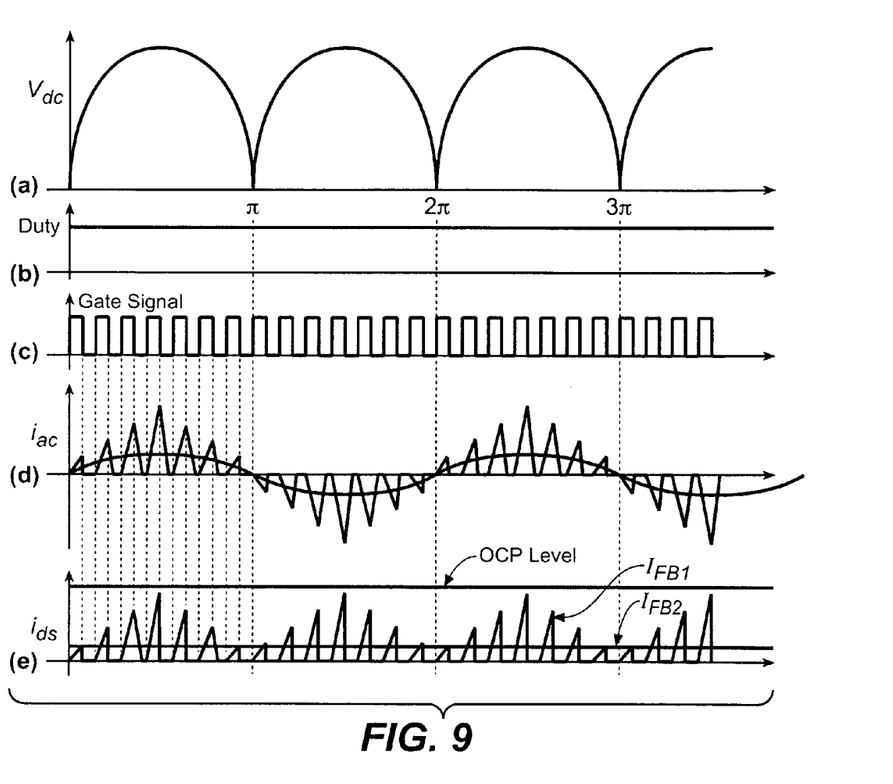
FIG. 9 is a diagram for exemplary operational waveforms in the power converter, according to an embodiment of the present invention.

Power block 18 is a single power stage for power converter 10. The power block 18 receives a rippled DC voltage because there is no bulky capacitor across the rectified DC voltage terminal C. Hence, the input voltage of power block 18 becomes a rectified AC input voltage as shown in FIG. 9 at part (a). The power block 18 not only converts this rippled DC input voltage into a regulated DC current Ic at the output terminals A and B of the power block 18, but it also makes the AC input current to be a sinusoidal waveform synchronized with the AC input voltage so that the power factor of AC input becomes unity. The regulated DC current Ic is used to control the brightness of the one or more LEDs 12. In some embodiments, all or a part of power block 18 may be implemented on one or more integrated circuit (IC) devices. Therefore, power block 18 supports or provides power factor correction (PFC) and LED current regulation simultaneously. Because power converter 10 achieves both PFC and LED current regulation using a single power stage, it has higher efficiency than previous designs, and at lower cost.

In one embodiment, power block 18 implements a control method which is a hybrid of digital and analog control. That is, power block 18 uses digital control for low dynamic control of the current Ic flowing to the LEDs 12 and analog control for cycle-by-cycle protection against over-current conditions.

Figure 2:
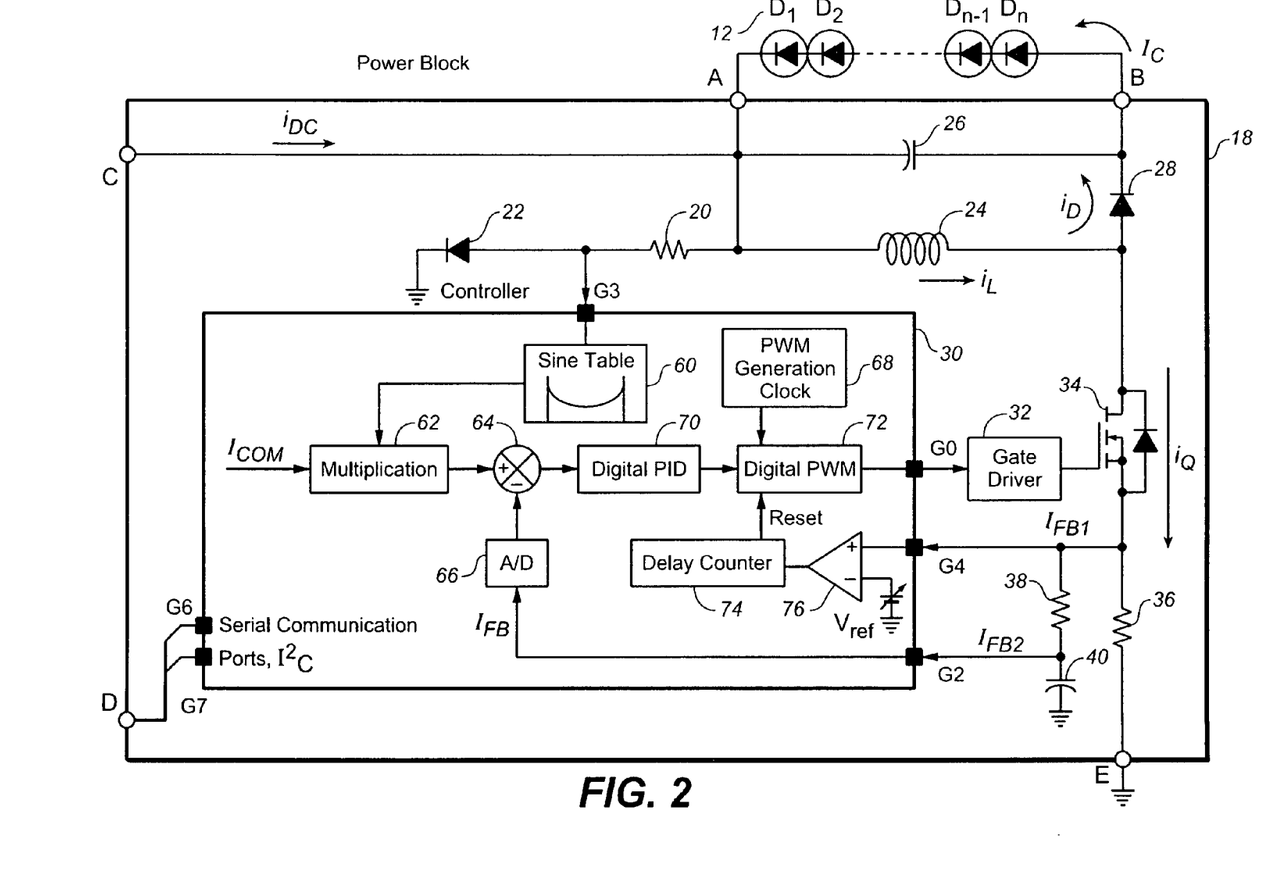
FIG. 2 is a schematic diagram in partial block form of an exemplary implementation for a power block, according to an embodiment of the present invention.

FIG. 2 is a schematic diagram in partial block form of an exemplary implementation for a power block 18, according to an embodiment of the present invention. As depicted, power block 18 comprises a resistor 20, a diode 22, an inductor 24, a capacitor 26, a diode 28, a controller 30, a gate driver 32, a power switch 34, a sensing resistor 36, a resistor 38, and a capacitor 40.

The rectified input voltage Vdc, along with the associated current Idc, is received by power block 18 at its input terminal C. Resistor 20 and diode 22 sense a synchronization condition for the rectified voltage Vdc. That is, resistor 20 and diode 22 may be used to determine or identify each instance that AC input voltage crosses the zero point. This signal is provided to controller 30. A main power conversion circuit includes inductor 24, capacitor 26, diode 28, and power device 34 with current sensing resistor 36.

In one embodiment, power switch 34 may be implemented with a MOSFET or a bipolar transistor and Insulated-Gate Bipolar Transistor (IGBT). Gate driver 32 drives the gate of power switch 34. Controller 30 functions to control the driving of power switch 34 by gate driver 32. Resistor 36 senses the low-side current, which can be used for estimating the current delivered to LEDs 12. The current sensing is provided as feedback to controller 30 in the form of a first feedback current sensing signal IFB1. The first feedback current sensing signal IFB1 provides relatively fast and sensitive feedback and may be used for protection against over-current or short conditions, or other conditions that could damage power block 18. A second feedback current sensing signal IFB2 is generated with resistor 38 and capacitor 40 (which acts as a filter for stabilizing the signal). The second feedback current sensing signal IFB2 provides slower, but more stable feedback relative to the first feedback current sensing signal IFB1. The second feedback current sensing signal IFB2 is also provided to controller 30 and can be used for determining, developing, or estimating an average value of the current delivered to LEDs 12. As such, the second feedback current sensing signal IFB2 may be used controlling the driving of switch 34 for regulating the current delivered to LEDs 12. The first and second feedback current sensing signals IFB1 and IFB2 may be analog.

Controller 30 receives the crossing point signal developed by diode 22 at an input terminal G3. Controller 30 receives the first and second feedback current sensing signals IFB1 and IFB2 at input terminal G4 and G2. Controller 30 provides a control signal to gate driver 32 at a terminal G0. Controller 30 may comprise circuitry implemented on a single IC device. In one embodiment, for example, controller 30 may be implemented with a FMS7401 power controller, which is commercially available from Fairchild Semiconductor Corporation. An internal block diagram for a FMS7401 power controller is shown FIG. 6.

As shown in FIG. 2, in one embodiment, controller 30 may comprise a sine table module 60, a multiplication module 62, an adder module 64, an analog-to-digital (A/D) converter 66, a clock generation module 68, a digital proportional-integral-differential (PID) module 70, a digital pulse width modulation (PWM) control module 72, a delay counter 74, and a comparator 76.

In operation, power converter receives the AC input voltage Vac at its input terminal. The waveform for the AC input voltage Vac can be described with the following formula: $v_{ac}(t) = \sqrt{2}V_{rms} \sin \omega t$, where $$\omega = 2\pi f = \frac{2\pi}{T}.$$

Rectifier 16 rectifies the sinusoidal AC input voltage Vac to produce the DC voltage Vdc at terminal C of power block 18 in FIG. 1. The DC voltage Vdc has the waveform shown in FIG. 9 at part (a). The waveform for the rectified DC voltage Vdc can be described with the following formula: $v_{dc} = |V_{pk}| \sin \omega t$. The duty D is defined with the turn ON time, $t_{on}$, switching frequency $f_s = 1/T_s$ as $$D \equiv \frac{t_{on}}{T_s} \Rightarrow t_{on} = T_s D.$$

If a fixed duty control signal (as shown in FIG. 9 at part (b)) is provided by the controller 30, then switch 34 is turned on or off with the fixed on or off times as shown in FIG. 9 at part (c). The waveform of FIG. 9 part (c) shows the signal at terminal G0 which is provided to control the driving of the gate of switch 34 in FIG. 2.

If switch 34 is turned on with a rippled DC voltage Vdc, the inductor current iL flows from terminal C (Vdc) through inductor 24, switch 34, and sense resistor 36, to ground (GND) at terminal E as shown in FIG. 2. Therefore the inductor 24 stores energy with the flowing current. Alternately, if switch 34 is turned off, inductor current iL is decreased and the energy stored in the inductor 24 is released to the output capacitor 26 and LEDs 12 through the diode 28. Thus, when switch 34 is turned on, energy is being stored; otherwise, when switch 34 is turned off, energy is being released. While switch 34 is turned off, the LED current is supplied from capacitor 26. Accordingly, LED current is flowing without any interruption regardless of the switching action of switch 34. LED current Ic is proportional to the duty value, which is a ratio of the time that switch 34 is turned on versus the switching time. A longer time of switch 34 being turned on or a higher duty value provides higher current and greater brightness of LEDs 12. Therefore, the LED brightness can be controlled by adjusting the duty value.

The current flowing through switch 34 is sensed using current sensing resistor 36 to generate the first feedback current sensing signal IFB1. The first feedback current sensing signal IFB1 is provided to the non-inverting input of comparator 76 of power block 18 without any time delay. If an adjustable reference voltage Vref for comparator 76 is set to a over-current protection (OCP) level, the power converter 10 can be safely protected from any failure of one or more LEDs 12 or any short circuit between terminals A and B of power block 18. In particular, if the voltage level of the first feedback current sensing signal IFB1 is larger than the adjustable reference voltage Vref, the output of comparator 76 becomes high, which in turn resets the digital PWM control module 72. Since there is a capacitor (not explicitly shown) between the gate and source of power switch 34, a gate-charging current is sensed when a high level gate voltage is issued from gate driver 32 to the gate of switch 34. Since this charging current is not indicative of the drain current of switch 34, it should be ignored so that the sensed current represents a real drain current of switch 34. This operation is referred to as a Leading-Edge-Blanking (LEB) operation. The delay counter 74 implements a LEB operation for ignoring a sensed current for a setting time by the delay counter 74 when switch 34 is turned on. If the counting time set by the delay counter 74 expires after switch 34 is turned on, the delay counter 74 relays the output signal of comparator 76 to digital PWM control module 72 without any delay time. Hence, an output signal for the comparison of the sensed current signal with a reference voltage Vref is directly sent to digital PWM control module 72 so that its PWM output goes to low whenever the sensed current signal IFB1 is larger than the reference voltage Vref.

A/D converter 66 is part of a feedback loop for controlling the current provided to LEDs 12. To protect power block 18 against over-current condition or any fault conditions, a current-sensing signal should be processed without any delay time so that switch 34 is effectively turned off immediately. This fast protection is carried out by comparator 76 and digital PWM control module 72 through gate driver 32 without any delay loop as mentioned above. Typically, an analog-to-digital (A/D) converter needs a conversion time; it is undesirable to use it as a protection controller. Hence, a fast-protection operation is provided using an analog control loop. The current Ic to LEDs 12 is regulated or controlled based on a digital control block including A/D converter 66, digital PID module 70, and adder 64 as shown in FIG. 2. The digital PID module 70 and adder 64 can be implemented using software programming or digital hardware circuit. A/D converter 66 uses the second feedback current sensing signal IFB2, which is more stable because the second feedback current sensing signal IFB2 is filtered out of the first feedback current sensing signal IFB1. Second feedback current sensing signal IFB2 is generated by resistor 38 and capacitor 40 filtering the first feedback current sensing signal IFB1. The value of the second feedback current sensing signal IFB2 changes slowly because of large values for resistor 38 and capacitor 40. Second feedback current sensing signal IFB2 reflects the average current flowing into LEDs 12. For a digital current control, the analog second feedback current sensing signal IFB2 is converted into a digital form with A/D converter 66. The second feedback current sensing signal IFB2 is supplied to the input of A/D converter 66 through the G2 terminal of controller 30. The A/D converter 66 generates a digital value representing an average value of current flowing through LEDs 12. The first and second feedback current sensing signals IFB1 and IFB2 are shown in FIG. 9 at part (e).

Figure 8A:
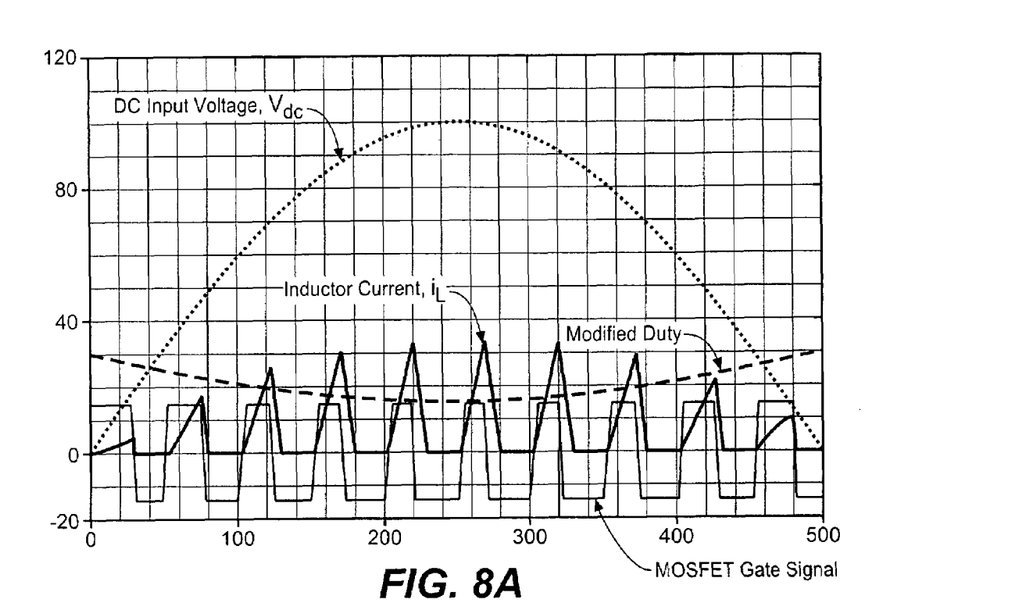
FIG. 8A is a diagram for exemplary waveforms for digital PWM operation with modified duty control, according to an embodiment of the present invention.
Figure 8B:
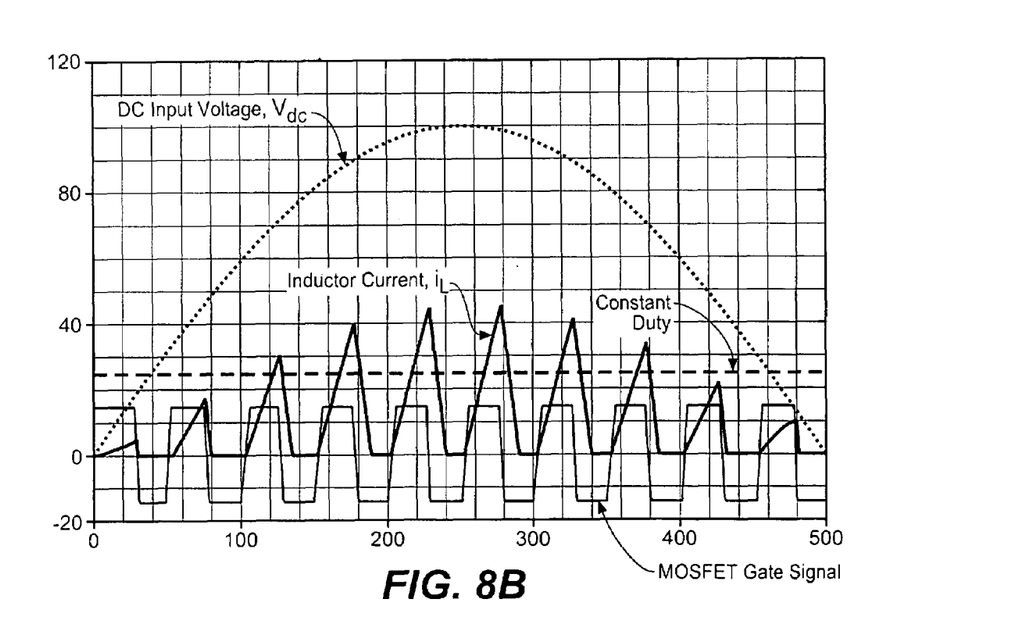
FIG. 8B is a diagram for exemplary waveforms for digital PWM operation with fixed duty control, according to an embodiment of the present invention.

Power block 18 may have fixed duty control or modified duty control. With fixed duty control, the value of the duty cycle signal for turning on switch 34 is fixed, as shown in FIG. 8B. The operational key waveforms of AC input voltage and current with fixed duty control are shown in FIG. 8B. For fixed duty signal, the AC input current waveform is shown in FIG. 9 at part (d). With modified duty control, the value of the duty cycle signal for turning on switch 34 varies and is synchronized in inverse proportion to the sine wave DC input voltage waveform Vdc, as shown in FIG. 8A.

In the embodiment depicted in FIG. 2, the power block 18 has modified duty control. The modified duty control serves to reduce harmonics (for example, the third harmonic) in the input AC line current, thus lowering harmonic distortions. Therefore, modified duty control provides for or supports more Total-Harmonic Distortion (THD) power factor correction (PFC). PFC may be desirable in an AC-to-DC power converter, for example, when the switching frequency of the AC-to-DC power converter is controlled with a digital method, which could cause an inherent third harmonic to appear in the AC input current if the duty cycle is controlled with a constant level as shown in FIG. 8B. This is a problem because it is hard to eliminate such harmonic using an EMI filter having a high cut-off frequency (it would need a low cut-off frequency EMI filter, which is bulky in size and expensive).

To solve this problem, sine table module 60 may store, implement, or execute an internal sine table for PFC. The sine table is addressed in a timer routine. Whenever AC input voltage becomes zero level or crosses the zero point (as sensed or determined by resistor 20 and diode 22), the address of sine table module 60 is initialized and synchronized with the AC input voltage. Sine table module 60 can thus be synchronized with the line frequency of AC input voltage. The internal sine table is used to modify an input current command signal Icom. Therefore, the duty command is modified as shown in FIG. 8A. The modification factor provided from sine table 60 ranges from 0.5 to 0.9, according to the amount of third harmonics in AC input current. The current command Icom indicates a level of current required for LEDs. This current command Icom is multiplied by the sine data from sine table 60. So the current command Icom is modified as shown in FIG. 8A. Referring to FIG. 8A, the modified duty signal level is low in the center of the AC waveform. This means that the peak current level of AC input current is diminished slightly compared with the case of constant duty control. Accordingly, the third harmonic problem can be effectively eliminated, thus reducing or lowering total-harmonic-distortion (THD).

The inductor current iL becomes small when DC input voltage Vdc is low around zero crossing point. If the DC input voltage Vdc is zero, then inductor current iL also becomes zero. As DC input voltage increases, inductor current iL is also increased. Therefore, if the switching frequency is relatively high, then the inductor current iL may have high harmonic terms. If these high harmonic terms are eliminated, then the fundamental frequency is synchronized with DC input voltage as well as AC input voltage, as can be seen in FIG. 9 parts (a) and (d).

Figure 6:
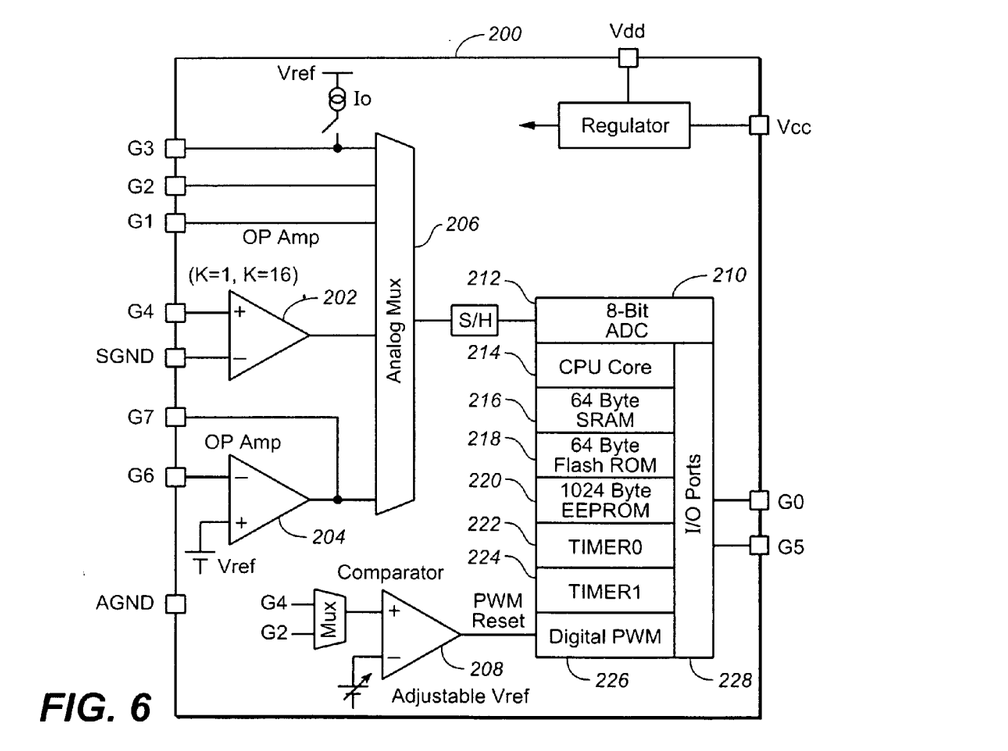
FIG. 6 is an internal block diagram for a power controller.

In an implementation of controller 30 using a FMS7401 power controller, sine table module 60 may be implemented with programming which is stored in EEPROM or masked ROM and executed by the CPU Core (see FIG. 6). Additional details for modified duty control are provided in related U.S. application Ser. No. 10/858,701, entitled "A Modified Sinusoidal Pulse Width Modulation For Full Digital Power Factor Correction" filed on Jun. 2, 2004, the disclosure of which is incorporated herein in its entirety.

The output of sine table module 60 is provided to multiplication module 62. Multiplication module 62 receives a current command signal Icom, which is modified according to the sine table of module 60. The current command signal Icom is provided to control the LED current Ic. In one embodiment, if a higher value for the current command signal Icom is given, more LED current is provided for brighter LEDs 12. Multiplication module 62 modifies the current command signal Icom (for duty cycle) according to the output of sine table module 60 in order to reduce or eliminate the third harmonic component of the input current idc.

The output from multiplication module 62 is added to the output from A/D converter 66 at adder 64. Digital PID module 70 receives the output from adder 64. Digital PID module 70 can be implemented by software and executes the routine for calculating a desired output duty value so that the output of adder 64 is zero. This can be done, for example, by comparing the average LED current level with an internal desired current level. The digital PID module 70 implements a digital PID control routine, which is understood by those of ordinary skill in the art. The digital PID routine calculates or generates a duty control signal so that the LED current Ic is regulated to a desired level.

Digital PWM control module 72 generally functions to regulate or control, in part, the current Ic delivered to LEDs 12 by power block 18. The digital PWM control module 72 receives the output from the digital PID module 70 and a clock signal from clock generation module 68. The digital PWM control module 72 provides an output signal (at a terminal G0) for controlling the gate of switch 34, as shown in FIG. 2. In one embodiment, digital PWM control module 72 may implement, in part, a software routine for regulating LED current.

As described herein, the power block 18 may implement a hybrid control technique which uses both digital and analog control. Digital control—which is implemented with A/D converter 66, sine table module 60, multiplication module 62, clock generation module 68, digital PID module 70, and digital PWM control module 72—is used for controlling the current delivered to the LEDs 12. Analog control—which is implemented with comparator 76 and delay counter 74—may be used for over-current protection (OCP). One reason for the hybrid control technique (using both digital and analog control) is that while it is difficult to provide over-current protection using a slower A/D converter, a faster A/D converter and high-speed CPU core having a very fast instruction execution capability are more expensive. The hybrid control technique allows for A/D converter 66 to be implemented as a slower speed A/D converter, thus reducing cost. But relatively fast performance for over-current protection is provided by using analog comparator 76 for cycle by cycle over-current protection.

Controller 30 may receive other input/output signals (e.g., for commands, data, or addresses) at terminals G6 and G7. These terminals can be serial communication ports or any other suitable port, using any suitable protocol or technique (e.g., I²C).

Figure 3:
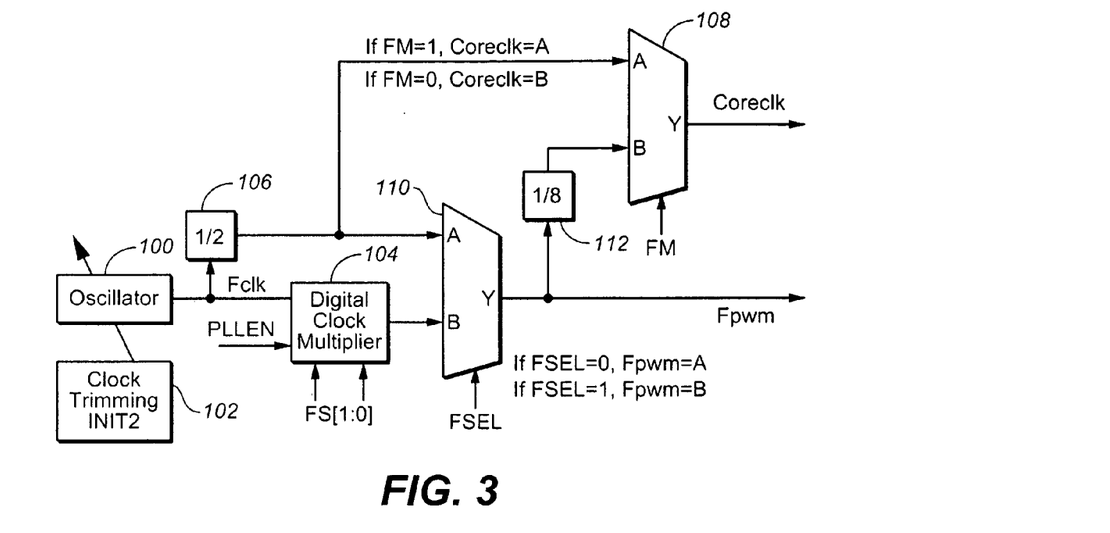
FIG. 3 is a diagram of an exemplary implementation for a clock generation module, according to an embodiment of the present invention.

FIG. 3 is a diagram of an exemplary implementation for a clock generation module 68, according to an embodiment of the present invention. Clock generation module 68 may be part of controller 30 and generally functions to provide one or more clock or oscillation signals for controller 30. As depicted, clock generation module 68 may include an internal oscillator 100, a clock trimming module INIT2 102, a digital clock multiplier 104, dividers 106 and 112, and multiplexers 108 and 110.

The internal oscillator 100 generates an oscillation signal Fclk which can have a frequency of, for example, 2 MHz. The clock trimming module INIT2 102 can be an initialization register for setting the frequency of the oscillation signal Fclk. Divider 106 receives the oscillation signal Fclk and may divide the frequency of the same. That is, divider 106 generates a clock signal which has a frequency that is a fraction (e.g., one-half) of the frequency of the oscillation signal Fclk. Thus, if oscillation signal Fclk has a frequency of 2 MHz, divider 106 may generate a signal with a frequency of 1 MHz. The oscillation signal output from divider 106 is provided to an A input terminal of each of multiplexers 108 and 110.

Digital clock multiplier 104 receives the oscillation signal Fclk along with an enable PLLEN signal. In one embodiment, the digital clock multiplier 104 may be implemented using one or more phase-locked-loop (PLL) circuits. The digital clock multiplier 104 may generate one or more clock signals having respective frequencies which are multiples (e.g., 2×, 4×, 8×, 16×) of the frequency of the oscillation signal Fclk (e.g., 4 MHz, 8 MHz, 16 MHz, or 32 MHz). The multiplication factor of the digital clock multiplier 104 can be adjusted using a 2-bit FS[1:0] register, where FS[1:0] =PSCALE[6:5] and the enable signal PLLEN=PSCALE[7]. PSCALE can be, for example, an 8-bit value (PSCALE[8:0]) which is stored in a suitable register (see FIG. 4). If the oscillation signal Fclk is set to 2 MHz, the output of the digital clock multiplier 104 can be 8 MHz, 16 MHz, 32

MHz, or 64 MHz depending on FS[1:0]. The output signal from digital clock multiplier 104 is provided to a B input terminal of multiplexer 110.

Figure 5:
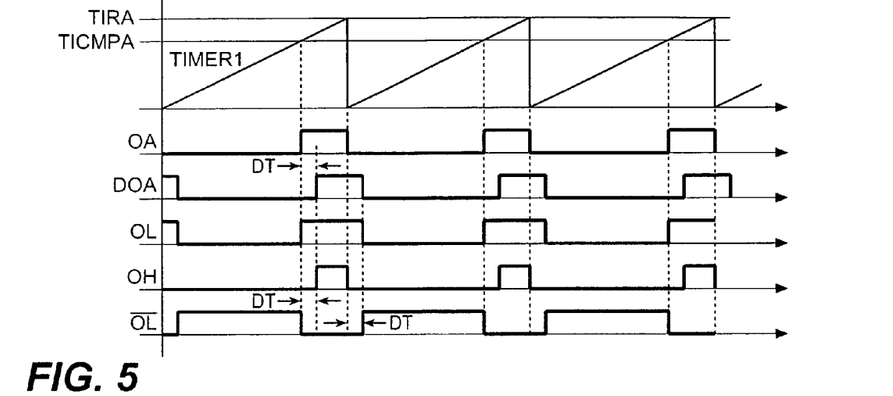
FIG. 5 is a diagram for exemplary waveforms for a digital PWM module, according to an embodiment of the present invention.

The multiplexer 110 receives a control signal FSEL, where FSEL is bit-4 of PSCALE register. In one embodiment, if control signal FSEL=0, then multiplexer 110 outputs the signal appearing at its A input terminal; and if control signal FSEL=1, then multiplexer 110 outputs the signal appearing at its B input terminal. The output of multiplexer 110 is a signal Fpwm, which can be used as a base clock signal for the digital PWM control module 72. The output of digital clock multiplier 104 goes to the digital multiplexer 110 input B as shown in FIG. 5. The output of multiplexer 110 can be 1 MHz if FSEL=0 or one of 8 MHz, 16 MHz, 32 MHz, or 64 MHz if FSEL=1. Thus, depending on a set value of FS[1:0] and control signal FSEL, the Fpwm clock signal can have a frequency from, for example, 1 MHz up to 64 MHz.

Divider 112 receives the signal Fpwm from multiplexer 110 and may generate a clock signal which has a frequency that is a fraction (e.g., one-eighth) of the frequency of the signal Fpwm. Thus, if oscillation signal Fpwm has a frequency of 8 MHz, divider 112 may generate a signal with a frequency of 1 MHz. The oscillation signal output from divider 106 is provided to a B input terminal of multiplexer 110.

Multiplexer 108 receives a control signal FM. In one embodiment, if control signal FM=0, then multiplexer 110 outputs the signal appearing at its A input terminal; and if control signal FM=1, then multiplexer 110 outputs the signal appearing at its B input terminal. The output of multiplexer 108 is a signal Coreclk, which can be used as a base clock signal for executing software instructions in power block 18.

Figure 4:
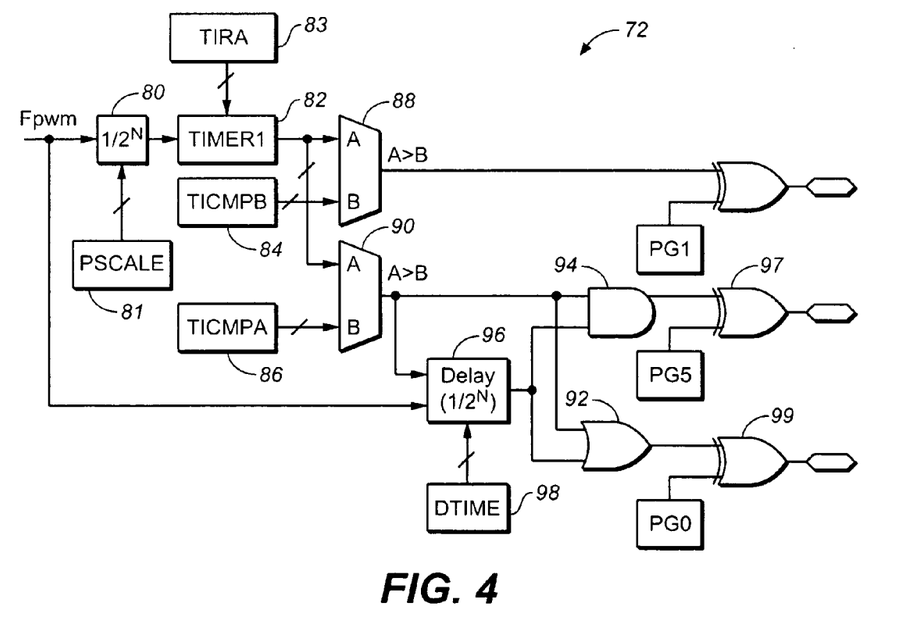
FIG. 4 is a diagram of an exemplary implementation for a digital pulse width modulation (PWM) module, according to an embodiment of the present invention.

FIG. 4 is a diagram of an exemplary implementation for digital pulse width modulation (PWM) module 72, according to an embodiment of the present invention. Digital PWM module 72 may be part of controller 30. FIG. 5 is a diagram for exemplary waveforms for a digital PWM module 72, according to an embodiment of the present invention. Digital PWM module may implement pulse width modulation (PWM). Digital PWM module 72 may function to provide signals for controlling the driving of switch 34. The output signals from digital PWM module 72 may be provided at terminals G0, G1, and G5. The output signal at terminal G5 may be referred to as the high-side output signal, and the output signal at terminal G0 may be referred to as the low-side output signal.

Referring now to FIGS. 4 and 5, as depicted, digital PWM module 72 may include a divider 80, a PSCALE register 81, a counter TIMER1 82, a pre-load register T1RA 83, registers T1CMPA 86 and T1CMPB 84, digital comparators 88 and 90, OR-gate 92, AND-gate 94, delay counter 96, a register DTIME 98, and exclusive-OR-gates 97 and 99.

The digital PWM module 72 may receive the clock signal Fpwm from the clock generation module 68 at divider 80. Divider 80 divides the frequency of the clock signal Fpwm by $2^N$. The divider 80 can be implemented as a 3-bit PS[2:0] register, where PS[2:0]=PSCALE[2:0]. PSCALE register 81 may be a register for storing a PSCALE value, which can be an 8-bit value (e.g., PSCALE [7:0]). The output of the divider 80 is used as the input clock signal for counter TIMER1 82. Counter TIMER1 82 may be implemented as a free-running 12-bit up-counter, with a value which increases over time, is reset, and then repeats (see FIG. 5).

The digital driving frequency of digital PWM module 72 can be controlled by changing a value in pre-load register T1RA 83, depending on control modes. In particular, the pre-load register T1RA 83 provides a value to counter TIMER1 82 for resetting the counter TIMER1 82. Referring to FIG. 5, when the value of the counter TIMER1 82 is equal to the value provided by pre-load register T1RA 83, the counter TIMER1 82 is reset. Thus, if the value provided by the register T1RA 83 is set to be lower, a higher PWM frequency is obtained.

Registers T1CMPA 86 and T1CMPB 84 and two digital comparators 88, 90 support pulse width modulation (PWM). Each of registers T1CMPA 86 and T1CMPB 84 can be implemented as 12-bit registers. Digital comparator 88 compares the value of TIMER1 against the value of register T1CMPB 84. Digital comparator 90 compares the value of TIMER1 against the value of register T1CMPA 86. For a digital power conversion, the register T1CMPA 86 can be programmed by loading the register so that the driving ON or OFF time of switch 34 can be controlled.

With reference to FIG. 5, a signal OA is the output of the digital comparator 90, which compares TIMER1 with T1CMPA. If the value of TIMER1 is larger than the T1CMPA value, then signal OA becomes high. This signal OA is applied to one of two inputs of each of OR-gate 92 and AND-gate 94. When the value of TIMER1 reaches the value stored in T1RA 83, then the counter of TIMER1 is reset. Delay counter 96, which receives the clock signal Fpwm, delays the signal OA output from digital comparator by a delay time DT. This delay time DT can be adjusted by the register DTIME 98. A signal DOA in FIG. 5 is an output of the delay counter 96. Signal DOA lags signals OA by delay time DT. For example, if the signal Fpwm has a frequency of 32 MHz ($t_{pwm}$=31.25 ns), the delay time DT can be adjusted up to 2 μs (31.25 ns×$2^6$). The signal DOA output from delay counter 96 is applied to the other of two inputs of each of OR-gate 92 and AND-gate 94.

OR-gate 92 has an output signal OL for a low-side and AND-gate 94 has an output signal OH for a high-side. There is a delay between output signals OH and OL (see FIG. 5). The signal OL is provided to one input of exclusive-OR-gate 97, and the signal OH is provided to one input of exclusive-OR-gate 99. An internal port PG5 provides another input to NOR-gate 97. An internal port PG0 provides another input to NOR-gate 99. Since the signal OL needs to be inverted for proper half-bridge operation, the internal port PG0 is set to "1". The output of exclusive-OR-gate 99 is a low-side gate signal provided at terminal G0 and can be the inverse of signal OL. The output of exclusive-OR-gate 97 is a high-side gate signal provided at terminal G5. There is a delay time DT between the OH signal and the inverted OL signal, as seen in FIG. 5. This delay time, which is defined by the DTIME register 98, constitutes some amount of dead time between the OH and inverted OL signals.

FIG. 6 is an internal block diagram for a power controller 200, which can be a FMS7401 power controller available from Fairchild Semiconductor. In one embodiment, the FMS7401 power controller 200 can be used to implement controller 30 of power block 18 in power converter 10. The FMS7401 power controller 200 includes components for both the digital and analog control described herein for controller 30.

For analog control, power controller 200 has, among other things, analog-based operational amplifiers 202, 204, multiplexer 206, and comparator 208. Comparator 208 may implement the comparator 76 of controller 30 (see FIG. 2).

For digital control, power controller has, among other things, a digital hardware block 210. The digital hardware block 210 includes analog-to-digital converter (ADC) 212, central processing unit (CPU) core 214, various memories SRAM 216, flash ROM 218, and EEPROM 220, counters 222 and 224, digital pulse width modulation (PWM) component 226, and input/output (I/O) ports 228. ADC 212 and digital PWM component 226 may implement the A/D converter 66 and digital PWM module 72 of controller 30 (see FIG. 2). One or more of the various memories 216, 218, and 220 may store software for sine table module 60 and digital PID module 70 (see FIG. 2), which is executed by CPU core 214.

Figure 7:
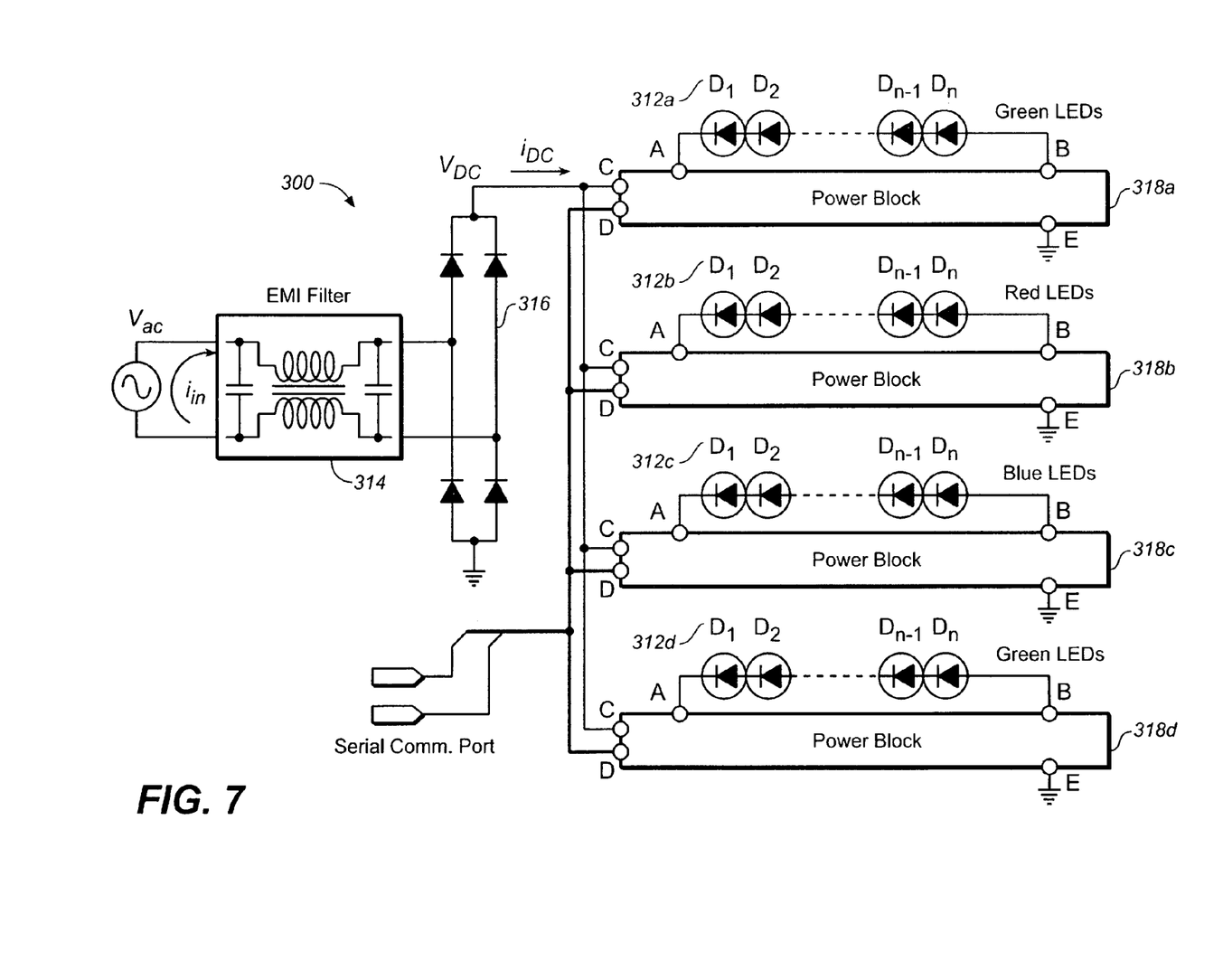
FIG. 7 is a schematic diagram in partial block form of an exemplary implementation for a digital single-stage power converter for driving multiple groups of LEDs, according to an embodiment of the present invention.

FIG. 7 is a schematic diagram in partial block form of an exemplary implementation for a digital single-stage power converter 300 for driving multiple groups of LEDs 312a, 312b, 312c, and 312d, according to an embodiment of the present invention.

One exemplary application for such a digital single-stage power converter 300 is a back-lighting of large screen LCD CTV (e.g., over 40 inches in size), which requires relatively high brightness. To provide this brightness, a white color is desirable. Although white-colored LEDs have been recently released, these white-colored LEDs do not have not sufficient brightness for use in a large screen CTV. Therefore, it is possible to combine or mix groups of LEDs in different colors (e.g., blue, green, red) to generate the desired high-brightness white color. LEDs of different colors, however, have different respective forward voltage drops and current flow ratings. It is therefore necessary to drive each color LED group separately so that the output strength for the different colors can be matched.

Referring to FIG. 7, the groups of LEDs 312a, 312b, 312c, and 312d may have the colors green, red, blue, and green, respectively. It is desirable to have two groups of green LEDs because the output strength of green LEDs is typically weaker than that of red and blue LEDs.

The digital single-stage power converter 300 is operable to drive each different color LED group 312a, 312b, 312c, and 312d independently while controlling the currents delivered to all of the different LED groups. In this embodiment, power converter 300 comprises a separate power block 318 (separately labeled 318a, 318b, 318c, and 318d) for each LED group 312a, 312b, 312c, and 312d. Power converter 300 also has a EMI filter 314 and a rectifier 316. In some embodiments, a single current command can be used for controlling the currents delivered to all of the different LED groups 312a, 312b, 312c, and 312d.

The implementation for each power block 318 can be substantially similar to that of power block 18 described herein. Since the controller 30 of each power block 318 operates digitally at least in part, input commands or driving conditions of power converter 300 can be transferred to or received from external circuitry through suitable ports using suitable techniques (e.g., serial communication, I²C). The green, red, blue LEDs groups 312a, 312b, 312c, and 312d are controlled with external current commands, while AC input current is controlled so that input power factor is corrected with low total-harmonic-distortion (THD).

As described herein, a single-stage power converter according to various embodiments of the present invention provide numerous technical advantages. These include, for example, the ability to drive any number of LEDs, either singularly or in groups. The single-stage power converter may have a low-side current sensing method to estimate high-side current flowing into LEDs. Furthermore, the single-stage power converter can control LED current as well as shape AC input current for power factor correction (PFC). The single-stage power converter can implement a hybrid control technique which has both analog and digital control. The single-stage power converter can also reduce or lower total-harmonic-distortion (THD), for example, using a sine table.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

The invention claimed is:

1. A power converter for driving at least one light-emitting diode (LED), the power converter comprising a single stage operable to provide both power factor correction (PFC) for input power and control of current delivered to the at least one LED, the single stage having no more than one inductor for power conversion, wherein the single stage comprises a sine table module for reducing total-harmonic-distortion (THD).

2. The power converter of claim 1 wherein the single stage uses digital control for control of current delivered to the at least one LED and analog control for over-current protection.

3. The power converter of claim 1 wherein the PFC for input power synchronizes an AC current and an AC voltage of the input power.

4. The power converter of claim 1 wherein the PFC for input power reduces total-harmonic-distortion (THD).

5. The power converter of claim 1 wherein the single stage comprises means for identifying a synchronization condition for the input power.

6. The power converter of claim 1 wherein the single stage comprises:
   a switch through which a current flows according to a duty cycle; and
   a controller coupled to the switch for controlling the duty cycle of the switch.

7. The power converter of claim 6 wherein:
   when the switch is turned off, more current is delivered to the at least one LED, thus causing the at least one LED to be brighter; and
   when the switch is turned on, less current is delivered to the at least one LED, thus causing the at least one LED to be dimmer.

8. A power converter for driving at least one light-emitting diode (LED), the power converter comprising a single stage operable to provide both power factor correction (PFC) for input power and control of current delivered to the at least one LED, the single stage having no more than one inductor for power conversion, wherein the single stage comprises means for identifying a synchronization condition for the input power, wherein the input power has an AC voltage component, and wherein the means for identifying a synchronization condition is operable to identify at least one instance of the AC voltage component crossing a zero point.

9. The power converter of claim 8 wherein the single stage uses digital control for control of current delivered to the at least one LED and analog control for over-current protection.

10. The power converter of claim 8 wherein the single stage comprises:
 a switch through which a current flows according to a duty cycle; and
 a controller coupled to the switch for controlling the duty cycle of the switch.

11. A single-stage power converter for driving at least one light-emitting diode (LED) using an input power, the converter comprising:
 means for providing power factor correction (PFC) for the input power; and
 means for controlling current delivered to the at least one LED;
 wherein the means for providing PFC and the means for controlling current collectively have no more than one inductor
 wherein the means for providing PFC comprises:
  a resistor and a diode for identifying a synchronization condition for the input power; and
  a sine table module for synchronizing a current component and a voltage component of the input power.

12. The single-stage power converter of claim 11 wherein the means for controlling current comprises a current sensing device for developing a signal indicative of the amount of current flowing through one branch of the power converter.

13. The single-stage power converter of claim 11 comprising a switch through which a current flows according to a duty cycle, wherein the means for controlling is coupled to the switch for controlling the duty cycle.

14. The single-stage power converter of claim 13 wherein:
 when the switch is turned off, more current is delivered to the at least one LED, thus causing the at least one LED to be brighter; and
 when the switch is turned on, less current is delivered to the at least one LED, thus causing the at least one LED to be dimmer.

15. The single-stage power converter of claim 11 wherein the means for controlling provides over-current protection.

16. The single-stage power converter of claim 15 wherein the means for controlling uses digital control for controlling current delivered to the at least one LED and analog control for over-current protection.

* * * * *